April 4, 1961   A. RICE   2,977,816
AUTOMATIC CHANGE-SPEED GEARING
Filed Oct. 8, 1959
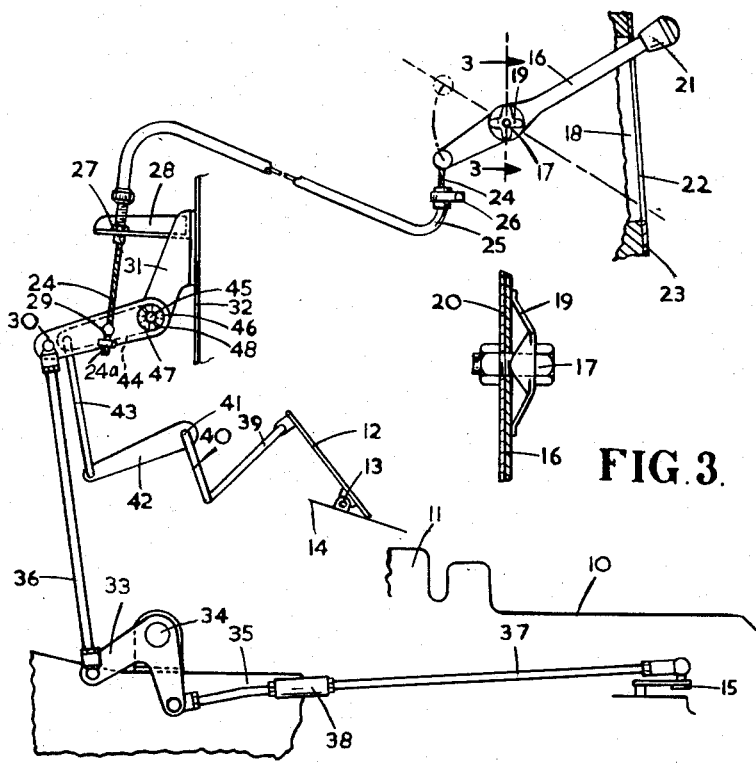

United States Patent Office
2,977,816
Patented Apr. 4, 1961

2,977,816
AUTOMATIC CHANGE-SPEED GEARING

Alec Rice, Castle Bromwich, England, assignor to Bristol Siddeley Engines Limited, Bristol, England Filed Oct. 8, 1959, Ser. No. 845,181

Claims priority, application Great Britain Oct. 17, 1958

3 Claims. (Cl. 74—472)

The invention relates to automatic change-speed gearing, particularly for a motor road vehicle (e.g., a motor car), of the kind in which a change of ratio is effected, under control of a governor, responsively to vehicle speed. When a motor car equipped with a change-speed gearing of the kind set forth, which usually provides three automatically engageable forward ratios, achieves a predetermined speed after starting in the first speed ratio, an intermediate speed ratio is automatically engaged under the control of the governor, and when a still higher predetermined speed is achieved the top speed ratio is engaged in like manner. However, conditions can arise during driving of a vehicle equipped with such a gearing when it is not desirable for the change of ratio automatically to be made, but for the existing speed ratio to be maintained when the predetermined speed is reached, and to this end it has hitherto been proposed to maintain the intermediate speed ratio engaged by providing an operable control for temporarily inhibiting the action of the governor.

There are, however, other conditions which can arise during the driving of such a vehicle which are not satisfactorily met by temporarily inhibiting the action of the governor, and these include the case where a long hill can be climbed, with intermediate speed ratio engaged, at a speed exceeding the predetermined vehicle speed at which an automatic change into top gear ratio would normally be effected, but where such an automatic change up is undesirable owing to the consequent loss of engine speed resulting in too low a power output to maintain the speed of the vehicle above the said predetermined speed. If, in these conditions the action of the governor were to be inhibited according to the prior proposal the intermediate ratio would remain engaged and this could result in the engine turning at an unnecessarily high number of revolutions, and producing an unnecessarily high power output for the intended speed of ascent of the hill. The object of the invention is to mitigate that disadvantage and to provide other advantages.

According to the invention an automatic change-speed gearing of the kind set forth is provided with a manually-operable means for resisting operation of the governor, for effecting a change of ratio, until the vehicle achieves a selected speed within a predetermined range of speeds. Thus, by actuating the manually-operable means to any predetermined extent within the said speed range the vehicle speed at which the governor will act to effect the automatic change can be varied.

Preferably the manually-operable means is associated with a scale graduated with the said range of vehicle speeds such that the said means can be set to pre-select the vehicle speed at which the automatic change will take place.

According to a further feature the manually-operable means includes a manually-operable lever, the movement of which can be friction-damped, connected by a transmission device to means for modifying the action of the governor.

One embodiment of the invention as applied to a motor car is illustrated by way of example in the accompanying drawings, in which:

Figure 1 is a diagrammatic side view;
Figure 2 is a plan view of an actuating arm for the governor of the gearing;
Figure 3 is an enlarged section on the line 3—3 of Figure 1;
Figure 4 is a front view of a portion of the motor car facia board showing a part of the manually-operable means, and
Figure 5 is an enlarged detail of Figure 1.

An automatic change-speed gearing of the kind set forth, which is of a well-known construction, is indicated at 10 in Figure 1, being mounted from the associated engine 11 of the motor car; and the engine accelerator pedal 12 is shown as pivoted at 13 from a part 14 of the motor car. The change-speed gearing has an exterior arm 15 which is adapted to be moved to different positions for resisting the action of the governor to different extents (i.e., to adjust the speed at which the governor effects a change of ratio).

For selecting a vehicle speed at which a change from intermediate to top speed ratio will be made automatically, the manually-operable means in the embodiment shown includes a lever 16 which is pivoted on a horizontal axis at 17 from stationary structure behind the facia board 18. The pivot 17, as best seen from Figure 3, is provided with a friction damping washer 19 for holding the lever in an adjusted position against the said stationary structure, which is indicated at 20 in that figure. The outer end of the lever 16, which is equipped with a knob 21, extends through a vertical slot 22 in a plate 23 secured to the facia board.

In a position behind the facia board the inner end of the lever 16 is connected to one end of the inner member 24 of a Bowden cable, the adjacent end of the outer member 25 of the Bowden cable being suitably anchored at 26 to stationary structure. The opposite end of the outer member 25 is suitably anchored at 27 to a bracket 28, and the adjacent end of the inner member 24 extends slidably through a trunnion 29, rotatively supported from an arm 30 intermediate the ends of the latter, and is provided with a head 24a which can have slight clearance from the trunnion when the lever 16 is in its zero position. One end of the arm 30 is pivotally supported, in a manner presently to be described, from a bracket 31 fast with a bulkhead 32 extending between the passenger and engine compartments of the motor car. It will be seen that the bracket 28 is also supported from this bulkhead.

The other end of the arm 30 is connected to operate the arm 15 of the change-speed gearing through a bell-crank lever 33, pivoted at 34 from vehicle structure 35, and links 36 and 37. The link 37 is made adjustable for length as indicated at 38.

The accelerator pedal 12 is connected by a link 39 to one arm 40 of a bell-crank lever which is pivoted to stationary structure at 41. The other arm 42 of this bell-crank lever is connected by a link 43 to an arm 44 which is pivoted on the same axis as the arm 30.

For pivotally supporting the arms 30 and 44, the arm 44 is fast with a shaft 45 which is journalled in bearings (not shown), and the arm 30 has a boss journalled on the shaft. This boss is formed with two diametrically-opposite, axially-extending abutments 46 and 47 between which a through-pin 48 of the shaft 45 extends with angular clearance.

Conveniently, and as shown in Figure 4, the slot 22 in plate 23 is graduated in vehicle speeds at which it may be desired for the automatic change from intermediate to top gear ratio to be effected automatically; and the setting of the lever 16 along the slot causes the head 24a to adjust the angular position of arm 30 and the setting of arm 15. This adjustment, as indicated in Figure 5, of arm 30 creates clearance between the abutments 46 and 47 on the one hand, and the through-pin 48 on the other hand so that when the clearance has been taken up by depressing the accelerator sufficiently for the vehicle engine to have achieved the necessary power, the automatic change is effected at the preselected vehicle speed. When the clearance has thus been taken up further upward movement of arm 44 raises the trunnion 29 of arm 30 off the head 24a.

It will be seen that the action of the governor will be modified progressively as the lever 16 is moved from one end to the other of the slot 22; and the calibration of the slot with a range of vehicle speeds enables the governor to be set for effecting the change of ratio automatically at any desired vehicle speed within the range.

In the upper extreme position of the lever 16 in the slot no modification of the normal automatic action of the governor is applied, and when the lever is in that position the governor acts to change the speed ratio only when the normal predetermined vehicle speed is attained. This position of arm 15 is indicated by the line 15a in Figure 2. The same figure shows at 15b and 15c respectively the positions of the arm 15 corresponding with a setting for the automatic change to take place at a preselected speed above the normal one, and with the kickdown position for the gearing. The chain line position of the arm 15 as shown in Figure 2 corresponds with the full throttle position at which the intermediate gear will be held in engagement up to 65 m.p.h.

What I claim as my invention and desire to secure by Letters Patent of the United States is:

1. Automatic change-speed gearing, for a motor road vehicle, of the kind in which a governor device is adapted, when the vehicle achieves a predetermined speed with an intermediate gear ratio engaged, automatically to engage a higher gear ratio, comprising a manually-operable means, an arm adapted to be moved for setting the vehicle speed at which the governor device will engage the said higher gear ratio, a first motion transmitting means, said first motion transmitting means interconnecting said manually-operable means and the governor setting arm, a vehicle engine accelerator pedal, a second motion transmitting means, a lost motion device, said second motion transmitting means interconnecting said accelerator pedal and said first motion transmitting means through said lost motion device, said manually-operable means being operable to set said governor setting arm to select the vehicle speed at which said higher gear ratio will be engaged and simultaneously to adjust the lost motion in said lost motion device whereby when said accelerator pedal will have been depressed for the vehicle to travel at the selected speed the lost motion in said lost motion device will be taken up and said higher gear ratio engaged.

2. Automatic change-speed gearing, for a motor road vehicle, of the kind in which a governor device is adapted, when the vehicle achieves a predetermined speed with an intermediate gear ratio engaged, automatically to engage a higher gear ratio, comprising a manually movable lever pivoted from stationary structure of the vehicle, an arm adapted to be moved for setting the vehicle speed at which the governor device will engage the said higher gear ratio, a first arm pivoted from stationary structure of the vehicle, a first linkage, said first linkage interconnecting said first arm and said governor setting arm, a motion transmitting device comprising a sheath containing a relatively slidable cable, said sheath having its ends fast with stationary structure of the vehicle, said cable having one end fast with said manually movable lever, a trunnion supported from said first arm, the other end of said cable extending slidably through a hole in said trunnion and provided with a head, a vehicle engine accelerator pedal, a second arm pivoted from stationary structure of the vehicle coaxially with said first arm, a second linkage, said second linkage interconnecting said accelerator pedal and said second arm, a lost motion connection between said first arm and said second arm, said manually movable lever being movable to move said first arm to set said governor setting arm through said second linkage whereby to select the vehicle speed within a predetermined range at which said higher gear ratio will be engaged, said movement of said first arm providing a predetermined lost motion in said lost motion connection, and depression of said accelerator pedal operating said second linkage to take up said lost motion until the vehicle attains the selected speed and said higher gear ratio is engaged.

3. Automatic change-speed gearing, according to claim 2, in which the manually movable lever extends transversely through a slot, in a facia of the vehicle, graduated in speeds such that the higher gear ratio will be engaged only when the vehicle speed equals that indicated by the graduation into conjunction with which said lever is moved.

References Cited in the file of this patent

UNITED STATES PATENTS

| | | |
|---|---|---|
| 2,730,909 | Svoboda et al. | Jan. 17, 1956 |
| 2,737,058 | Puls | Mar. 6, 1956 |
| 2,757,551 | Long | Aug. 7, 1956 |
| 2,767,594 | Du Shane | Oct. 23, 1956 |
| 2,771,788 | Frick et al. | Nov. 27, 1956 |
| 2,823,555 | Cislo | Feb. 18, 1958 |